June 24, 1930.  G. WEISSMANN  1,766,418
ELECTRIC CELL
Filed Nov. 8, 1926   3 Sheets-Sheet 1

G. Weissman
inventor

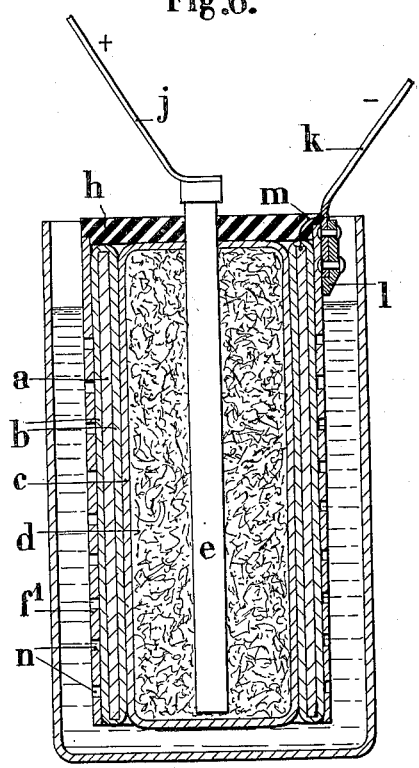

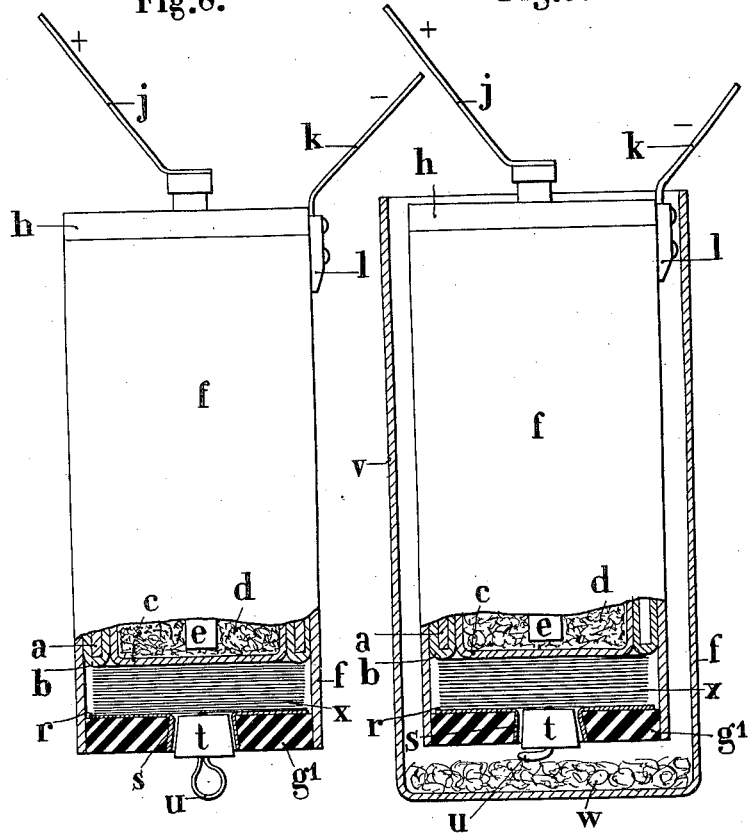

Patented June 24, 1930

1,766,418

UNITED STATES PATENT OFFICE

GUSTAVE WEISSMANN, OF PARIS, FRANCE

ELECTRIC CELL

Application filed November 8, 1926, Serial No. 147,054, and in France November 30, 1925.

The present invention relates to an electric cell possessing a large containing volume and a small internal resistance while taking up very little space. The cell forming the subject of the invention comprises:

A negative electrode formed by a sheet of zinc covered by a spongy insulating layer and folded over so as to form a deformable container;

A sachet or bag of permeable material containing the depolarizing agent in a powdered state and the positive electrode; this sachet is placed in the interior of the container formed by the negative electrode and the whole arrangement is subjected to a strong compression varying according to the type of cell it is desired to obtain and the uses to which it is to be put;

An outer tightening cover surrounding the whole compressed arrangement of the negative electrode and the sachet it contains; this cover is preferably formed by an inextensible band wound round the whole compressed arrangement described above so as to grip the latter tightly, and soldered or cemented on the latter in such a way as to keep the said arrangement in its state of compression.

This arrangement may be employed for the construction of dry cells and liquid cells.

In the case of dry cells the electrolyte is poured before or after the compression of the elements forming the cell and is absorbed at the same time by the spongy coating of the negative electrode and the depolarizing powder; the upper part and the lower part of the cell are closed by means of wax or other suitable material poured in the manner usually employed for closing dry cells, or the elements forming the cell will be placed, before their introduction into the tightening cover, into a bag of fluid tight material closed at its lower part.

In the case of liquid cells the lower part of the cell is not closed and the tightening cover is preferably perforated so as to permit the entry of the electrolyte.

The accompanying drawing illustrates, by way of example, various forms of construction of the cell forming the subject of invention.

Figure 1 is a vertical section taken along the line A—A in Figure 2.

Figure 2 is a horizontal section taken along the line B—B in Figure 1.

Figure 4 is a vertical section taken along the line C—C in Figure 5.

Figure 5 is a horizontal section taken along the line D—D in Fig. 4.

Figure 6 is a vertical section of a form of liquid cell.

Figure 7 shows in plan view a cell with three sections for pocket electric lamps.

Figures 8 and 9 show another form of the invention.

Figure 1:
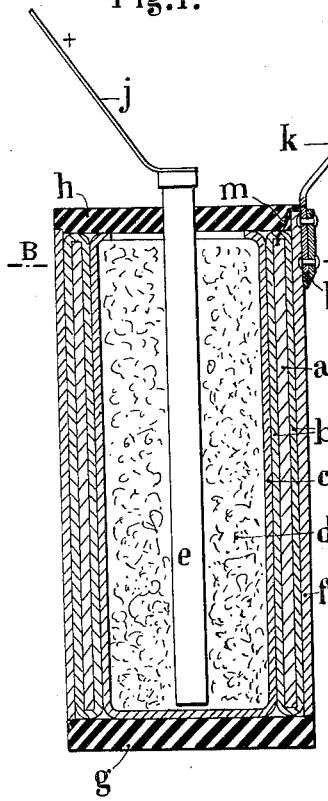
Figures 1 and 2 show a form of dry cell.
Figure 2:
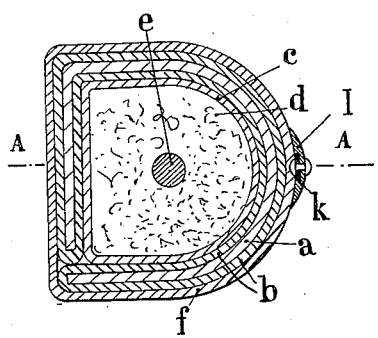

The cell element shown in Figures 1 and 2 comprises a negative electrode formed by a band of zinc $a$ protected by a casing $b$ which is pervious and not attacked by the electrolyte or the depolarizing agent. This container will, for example, be made of filter paper, blotting paper, linen cloth, etc., the band of zinc may previously be coated with a gum formed by a mixture of the liquid employed as electrolyte, or a solution of ammonia chloride, and rye or rice flour for example, or else between the band of zinc and its pervious container there may be interposed a sheet of filter paper or cloth impregnated with the gum mentioned above.

This negative electrode is curved and bent over as shown in Fig. 2 so as to form a deformable container, the internal volume of which may be reduced as explained hereinafter, under the action of a pressure exerted upon the periphery of the said electrode.

In the container thus formed is placed a sachet or bag $c$ also made of pervious material electrically insulating and not attacked by the electrolyte and the depolarizing agents.

This bag contains the depolarizing material $d$, for example a mixture of magnesium dioxide and graphite. In this depolarizing material is placed first of all a dummy rod, for example made of wood, which is subsequently replaced by the carbon rod $e$ which forms the positive electrode, as described hereinafter.

The arrangement of this negative electrode and of the bag $c$ containing the depolarizing agent $d$ and the dummy rod is placed in a press and subjected to a compression varying according to the type of cell it is desired to construct and the uses for which it is intended. For small pocket lamp battery elements a pressure of a few kilograms per square millimetre is sufficient while it may reach as much as 50 kilograms per square centimetre for large cells.

The agglomerated block thus obtained is placed in a cover $f$ formed for example by a sheet of celluloid wrapped round and cemented together and keeping the said agglomerated block in its state of compression, or preferably, an inextensible band such as a sheet of celluloid is wound round this agglomerated block as soon as it has been compressed, care being taken to strongly tighten this band, and finally the free edge of the said band is secured upon the latter by soldering or cementing.

The dummy rod is then removed and the carbon rod $e$ substituted for it, which has to form the positive electrode. This rod must have a diameter very slightly greater than that of the dummy rod so that it can be forced into the depolarizing mass $d$ contained in the bag $t$.

The electrolyte is then poured in until the absorbent materials are saturated (pervious container $b$ covering the band of zinc $a$, the bag $c$ containing the depolarizing agent $d$). Finally the cell element is closed at its lower part and at its upper part with a layer of wax, pitch or other suitable material $g$, $h$.

Figure 4:
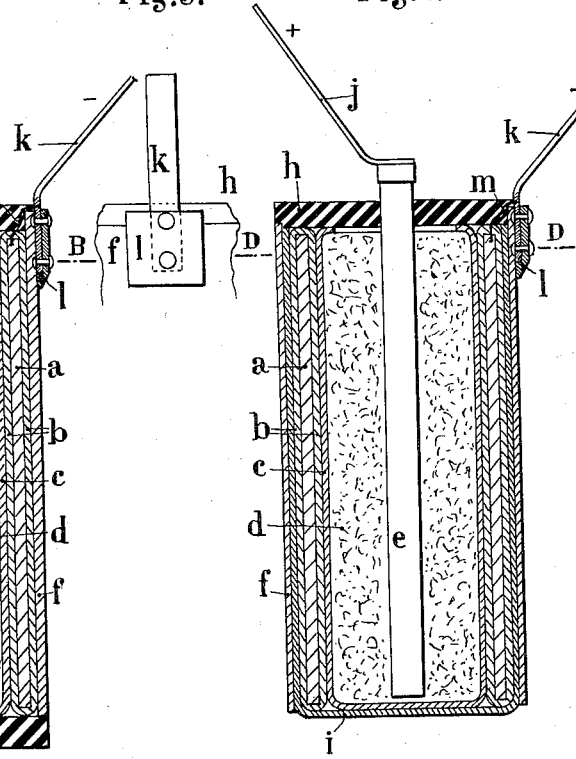
Figures 4 and 5 show another form of construction of a dry cell.
Figure 5:
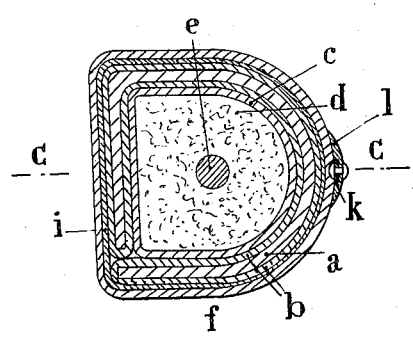

In the form of construction shown in Figs. 4 and 5 the agglomerated block formed by the negative electrode and the bag $c$ containing the depolarizing agent and the positive electrode, is placed, as soon as it has been compressed, in a bag $i$ made of fluid tight material, formed at its lower part, or is encased in a sheet of gutta-percha or other impervious material. The whole is then placed in a cover $f$ formed as described above. In this form of construction the cell element is closed at its lower part by the end of the fluid tight bag $i$; it is no longer necessary in this case to pour wax or pitch into the lower part of the cell element.

The positive current terminal $j$ is mounted in the usual manner upon the carbon electrode $e$.

Figure 3:
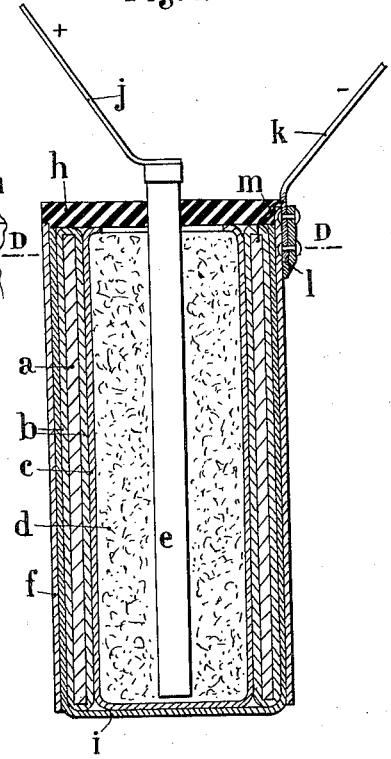
Figure 3 is a detail view showing the terminal attachment.

The negative current terminal is formed by a copper strip $k$ fixed by means of eyes or rivets, or by any other means, upon a band of celluloid $l$ cemented upon the cover $f$, Fig. 3. The connection of this strip $k$ to the zinc electrode $a$ is made by a conducting wire $m$ soldered at one end to this electrode $a$ and at the other to the strip $k$.

Figure 6 shows a form of the invention for constructing a liquid cell.

In this case the agglomerated block formed by the negative electrode and the bag $c$ containing the depolarizing agent and the carbon electrode is placed as soon as it has been compressed in an inextensible cover $f^1$, made of celluloid, for example, provided with perforations $n$. The element is not closed at its lower part so as to allow the electrolyte to have access to the pervious casing $b$ covering the negative electrode $a$ and to the bag $c$ containing the depolarizing agent.

According to the use, the zinc electrode of the cell forming the subject of the invention may be bent over into various forms. Thus, for example, in the case of a cell with three elements for pocket electric lamps the elements $o$, $p$, $q$ may be shaped as shown in Figure 7 which shows a plan view of the cell, the top layer of wax being assumed to have been removed. With this special form of the elements the cell thus obtained occupies a minimum of space. According to the invention, cells may also be constructed in which the negative electrode is bent over in such a way as to form a series of divisions in each of which is placed a bag or sachet containing the depolarizing agent and one or more carbon electrodes.

In the cell forming the subject of the invention the depolarizing agent, by virtue of its state of compression, is pressed directly upon the negative electrode and whatever be the shape given to the latter is in contact with all the points of this electrode. Moreover this state of compression is maintained simply by the outer tightening cover which may be simply a sheet of celluloid cemented on to the latter as described above. Consequently a cell may be constructed in this way which presents the double advantage of taking up the minimum amount of space and possessing a large volume together with a very small internal resistance.

In the dry cells constructed according to the invention the electrolyte can only be poured in after the mounting of the cell, so that the electrolyte can be poured only at the moment of utilization of the cell and that the duration and preservation of the cells may be prolonged after the latter has become exhausted, by pouring in a new charge of electrolyte or water. In this case the cell may comprise a tubulation through which the electroylte will be introduced into the cell, this tubulation being subsequently closed by a plug.

Figure 8 shows another form of the invention enabling liquid to be easily introduced into the cell. In this form the cell is provided at its lower part with a base $r$ provided with a tubulation $s$ through which the electrolyte can be admitted. Under normal conditions this inlet is closed by a plug $t$ preferably provided with a member by means of which it can be handled, formed for example by a wire grip $u$. This base $r$ is held in place by running in adhesive substance $g^1$ producing a fluid tight joint.

In order to prevent any risk of leakage of the electrolyte the cell described above may be placed in a case $v$ closed at its lower part and containing preferably a spongy material $w$ such as felt, blotting paper etc. as shown in Figure 9.

The cell forming the subject of the invention will contain preferably at its lower part a spongy material such as filter paper, wadding, sawdust, etc. impregnated with the electrolytic solution or water and destined to form a reservoir of liquid in order to compensate for the losses of liquid by evaporation which are produced at the end of a certain time and thus prolong the duration of the cell.

This reservoir forming plug may be provided in all the forms of construction described above and is illustrated by way of example in Figure 8 under the reference numeral $x$.

The present invention enables dry cells of all shapes to be easily produced, the fluid tightness of which cells is always ensured whatever be the degree of wear of the zinc.

Claims:—

1. In the process of manufacturing primary cells, the steps comprising covering over a sheet of zinc with a pervious insulating coating, folding said sheet in such a way as to form a deformable container, placing in the interior of space formed by said container, a bag made of pervious insulating material and containing a powdered depolarizing agent and the positive electrode, subjecting the whole arrangement thus formed to a compression, and surrounding the compressed arrangement with an outer tightening cover retaining the said arrangement in its state of compression.

2. In the process of the type described in claim 1, placing before compression, in the depolarizing agent a dummy rod and after compression of the block replacing said rod, by a positive electrode.

3. An electric cell comprising a negative electrode formed of a folded sheet of zinc, said sheet being covered with a pervious insulating coating, a bag of pervious insulating material disposed in said negative electrode, a powdered depolarizing agent in said bag, a positive electrode in said depolarizing agent, and an outer tightening cover surrounding this whole arrangement of the negative electrode and the bag and retaining said arrangement in a state of compression, the outer tightening cover of the cell consisting of a sheet of celluloid having cemented adjoining edges.

The foregoing specification of my "Improvements in and relating to electric cells" signed by me this 27th day of October, 1926.

GUSTAVE WEISSMANN.